July 14, 1970 F. GREENWOOD 3,520,072
SPELLING SYSTEM
Filed Dec. 13, 1967
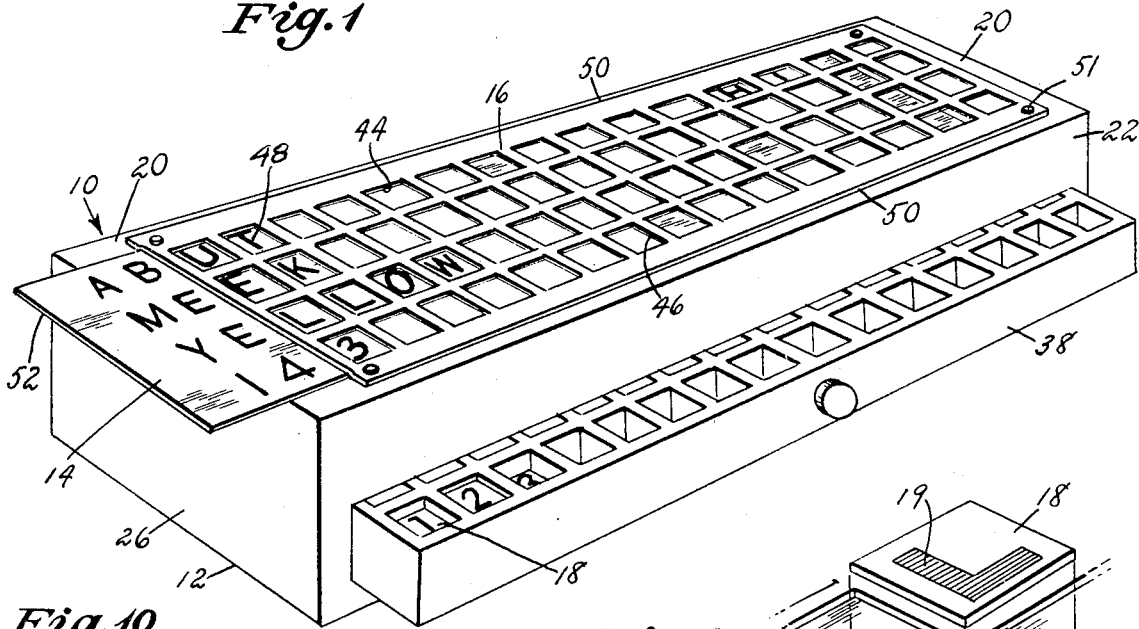
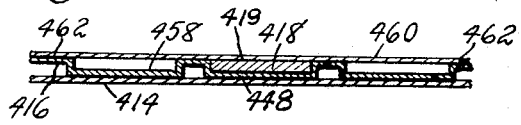
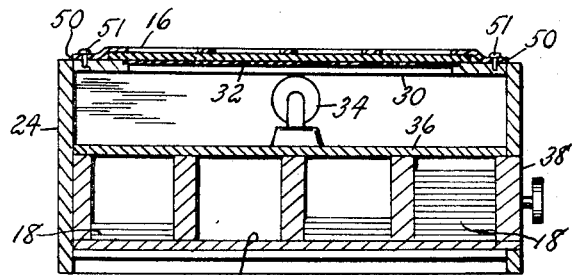
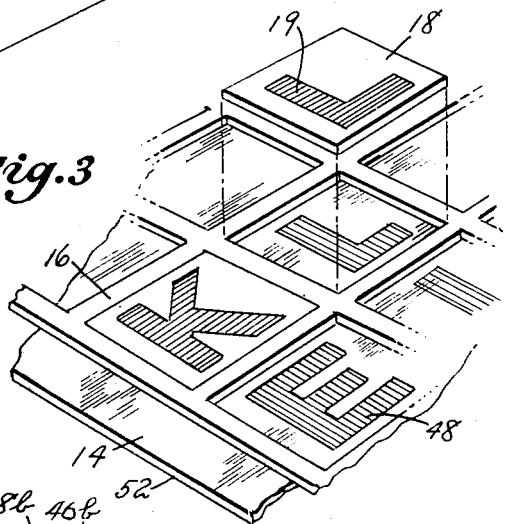
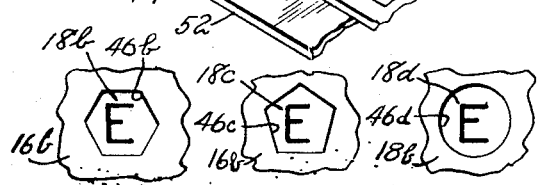
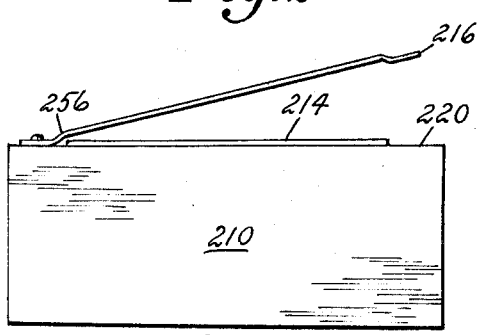
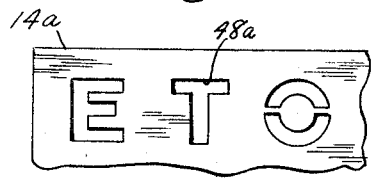
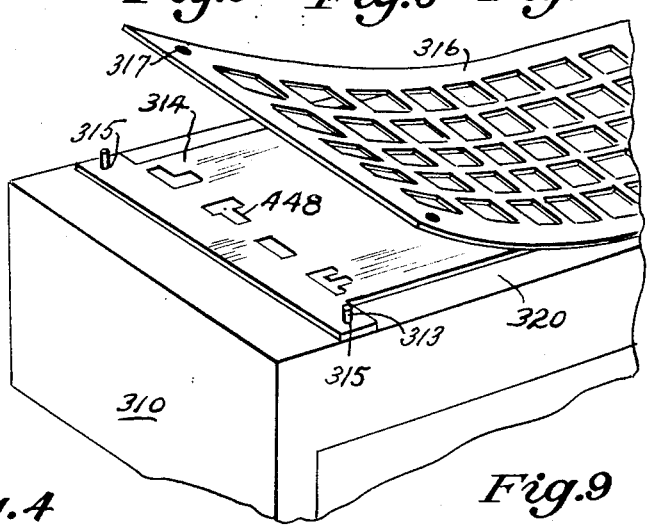

United States Patent Office 3,520,072
Patented July 14, 1970

3,520,072
SPELLING SYSTEM
Frank Greenwood, 200 Dyckman St.,
New York, N.Y. 10040
Filed Dec. 13, 1967, Ser. No. 690,352
Int. Cl. G09b 17/00
U.S. Cl. 35—35                                    1 Claim

ABSTRACT OF THE DISCLOSURE

Educational spelling system comprising a plurality of interchangeable indicia bearing panels carrying prespelled words arranged in context, the letters or numbers being arranged in predetermined positions; an orificed grid, the orifices of which juxtapose said letters or numerals; a plurality of separate cards each having a single letter or numeral corresponding to the letters or numerals on said panel, the cards being receivable within said orifices to overlie the identical letters or numerals.

---

This invention relates generally to educational systems and more particularly to such for the teaching of spelling.

It is among the objects of my educational spelling game to provide a teaching device for a child, four to nine years of age, in a manner that is simple, foolproof, and not above the specific age limit intellectually. The child imagines it is doing the spelling all by itself, and yet, every spelled out word is guided by the teacher, parent or custodian.

Very many spelling games are limited in their scope to several words, and with these several words, the game is finished. In my invention the game embraces every letter in the dictionary.

Another object of the present invention lies in the provision of educational apparatus in the form of a spelling game which can be used not only for English but also for any foreign language, whether the words are spelled from left to right, right to left (for example Hebrew), or vertically (for example Chinese).

These objects and other incidental ends and advantages will more fully appear in the progress of this disclosure and be pointed out in the appended claim.

In the drawings, in which similar reference characters indicate corresponding parts throughout the several views:

FIG. 1 is a front perspective view of a first embodiment of the invention.

FIG. 2 is a transverse vertical sectional view of FIG. 1 with the drawer element shown in closed position.

FIG. 3 is an enlarged fragmentary perspective view partially exploded, of the first embodiment.

FIG. 4 is an enlarged fragmentary plan view of a modification of the panel element of the first embodiment.

FIGS. 5, 6 and 7 are fragmentary plane views of three modifications of the borders of the orifices in the grid element of the first embodiment.

FIG. 8 is an end elevational view, partly broken away showing a second embodiment of the invention.

FIG. 9 is a fragmentary perspective view of a third embodiment of the invention.

FIG. 10 is a transverse sectional view of a fourth embodiment of the invention.

In accordance with the invention, the apparatus or device generally indicated by reference character 10, comprises broadly a housing or casing 12; a panel element 14; a grid element 16; and a plurality of individual cards 18.

The housing or casing 12 may be made of any suitable material such as molded synthetic resin, cardboard, wood, metal, or the like. The casing 12 has a top wall 20, front wall 22, rear wall 24, end walls 26, and bottom wall 28.

The top wall 20 is provided with an opening 30, within which is seated a translucent plate 32 preferably composed of a frosted sheet of synthetic resin.

Disposed within the upper portion of the casing 12 is a source of illumination 34 which may be a fluorescent tube with either self contained or external power source (not shown). The light source 34 is supported on a shelf 36. Disposed below the shelf 36 is a drawer element 38 having many compartments 40 in which are stored the cards 18, when they are not in direct use.

Superposing the top wall 20 is the grid element 16 which is provided with a plurality of bordered orifices 44 which are arranged in a predetermined pattern. While the number of orifices 44 may be varied to suit the particular requirements, I have found that sixty orifices arranged in four rows of fifteen each, is highly satisfactory. The borders 46 of orifices 44 have a predetermined shape and size to correspond to the indicia 48 which is disposed on the panel element 14. As to shape, the said borders are shown as square in FIGS. 1, 2 and 3, while in FIG. 5 a border 46b is shown as hexagonal, in FIG. 6 a border 46c is shown as pentagonal, and FIG. 7 a border 46d is shown as circular. Thus the cards 18 are square to fit within the borders 46, and the cards 18b, 18c and 18d to fit within the borders 46b, 46c and 46d are correspondingly proportioned and shaped at the peripheries thereof. The fit of the cards 18 in the orifices should be substantially exact, but sufficient clearance should be allowed so that the child may place and remove the cards easily.

The grid element is secured in a suitable manner along its longitudinal edges 50 to the top wall 20, for example by the pins 51, so that the panel element 14 may be slid between the under surface of the grid element and the upper surface of the top wall, to a position of proper alignment therewith.

The panel element 14 is composed of translucent sheet material with the said indicia thereon, arranged to coincide with the orifices 44 in the grid element. The panel element 14 is preferably slightly longer than the grid element so that at least one of the end edges 52 protrudes so that it may be easily grasped for insertion or substitution.

The editorial content of the words or other information on the panel element may be pre-printed or the teacher may provide a desired phrase or sentence for the child to use. For this purpose the panel element may be left blank with printed outlines corresponding to the borders 46, so that the letters or numerals on the panel element 14 will match up exactly with the orifices 44.

During use by the child, after the first of a series of panel elements 14 is put into place, the child opens the drawer 38 and the compartments 40 become fully exposed. The sixty compartments 40 make it possible for a full complement of cards 18 to be distributed therein in alphabetical and numerical order, with spare compartments to accommodate the additional compartments required for foreign languages. The child selects individual cards from the stacks thereof in the drawers, and places a card 18 whose indicia 19 duplicates the particular indicia 48 on the panel element 14 directly thereunder, and within the confines of the border 46 thereat. This is continued until all of the letters and/or numerals are covered. After this is accomplished, it is approved by the teacher or other supervisor, and then the cards are removed and returned to their proper places in the drawer 38. The particular panel element 14 is removed and another one substituted and the procedure may be repeated as desired.

In the modification shown in FIG. 4, the panel element 14a has the indicia 48a cut out to provide a stencil effect, through which the light from source 34 may project.

Turning to the second embodiment, shown in FIG. 8, to avoid needless repetition corresponding parts are given the same reference characters with a prefix "2."

In this embodiment, the grid element 216 is hingedly attached to the top wall 220 at 256, so that the panel element 214 is slipped into place from the front of the device 210, while the grid element 216 is elevated, and then the grid element is lowered to a normal horizontal position.

Turning to the third embodiment, shown in FIG. 9, here corresponding parts are given the same reference characters with the prefix "3."

The third embodiment differs in having the grid element 316 and the panel element 314 provided with keying holes 317 and 315 respectively which detachably engage upon the pins 313 projecting up from the top wall 320.

In the fourth embodiment, shown in FIG. 10, the grid element 416 is provided with a plurality of recesses or depressions, upon which the cards 418 are matched and placed to correspond with the panel 414. After all of the desired cards are in place, a transparent sheet 460 is secured in place by adhesive 462. Thus the finished arrangement forms an integrated unit which may be carried by the child from place to place (as in the case of "homework") or the whole grid element 416 may be hung upon a wall, like a picture, to display a motto, or proverb, or the like, with the cards 418 secured in the depressions 458.

It may thus be seen that I have provided a novel and highly useful educational system for teaching spelling to young children. Because in my spelling game, the child applies letters to words which are fully spelled out arranged in a meaningful context, not only does the child learn the spelling of the words, but also grammar, sentence structure, and factual material.

I wish it to be understood that I do not desire to be limited to the exact details of construction shown and described, for obvious modifications will occur to a person skilled in the art to which the present invention relates.

I claim:
1. A device for teaching spelling comprising: a grid element having a plurality of borders arranged in a first predetermined pattern, said borders having a predetermined shape and size; a plurality of cards having first indicia thereon; a panel element having a plurality of second indicia thereon; said second indicia being arranged in a second pattern; said panel element being positioned with respect to said grid element with the second indicia being visible through said borders; said cards being of a size and shape sufficient to be insertable within said borders, the first indicia on said cards matching the second indicia on said panel element; and a transparent sheet adapted to be selectively adhered to the upper surface of said grid element to form an integrated unit which may be carried with the cards maintained in predetermined position.

References Cited

UNITED STATES PATENTS

| | | | |
|---|---|---|---|
| 471,653 | 3/1892 | Sthreshley | 35—73 |
| 760,384 | 5/1904 | Dieterich | 35—71 |
| 1,728,805 | 9/1929 | Rivkin. | |
| 2,055,159 | 9/1936 | Scofield. | |
| 2,129,834 | 9/1938 | Funk. | |
| 2,584,601 | 2/1952 | Mauser | 35—73 |
| 2,899,756 | 8/1959 | Wise | 35—73 X |

FOREIGN PATENTS

| | | |
|---|---|---|
| 215,168 | 5/1924 | Great Britain. |
| 434,491 | 8/1935 | Great Britain. |

WILLIAM H. GRIEB, Primary Examiner

U.S. Cl. X.R.

35—73